(12) United States Patent
Fritz

(10) Patent No.: US 7,746,363 B2
(45) Date of Patent: Jun. 29, 2010

(54) ENTRY OF DATA IN A DATA PROCESSING SYSTEM

(75) Inventor: Helmut Fritz, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 130 days.

(21) Appl. No.: 11/304,963

(22) Filed: Dec. 15, 2005

(65) Prior Publication Data

US 2006/0136841 A1 Jun. 22, 2006

(30) Foreign Application Priority Data

Dec. 20, 2004 (EP) ................. 04030186

(51) Int. Cl.
*G09G 5/14* (2006.01)
(52) U.S. Cl. .............. 345/684; 345/619; 345/672; 345/682; 715/786; 715/787; 715/788; 715/789
(58) Field of Classification Search ........... 345/684, 345/418, 619, 672, 682; 715/818, 705, 786–789
See application file for complete search history.

(56) References Cited

U.S. PATENT DOCUMENTS

| | | | | |
|---|---|---|---|---|
| 5,175,813 | A * | 12/1992 | Golding et al. | 715/786 |
| 5,631,974 | A * | 5/1997 | Lau-Kee et al. | 382/132 |
| 5,737,737 | A * | 4/1998 | Hikida et al. | 707/104.1 |
| 5,799,315 | A * | 8/1998 | Rainey et al. | 707/102 |
| 5,841,959 | A * | 11/1998 | Guiremand | 345/440 |
| 6,002,398 | A * | 12/1999 | Wilson | 715/777 |
| 6,011,549 | A * | 1/2000 | Shoji et al. | 345/684 |
| 6,243,088 | B1 * | 6/2001 | McCormack et al. | 715/866 |
| 6,307,325 | B1 * | 10/2001 | Elloway et al. | 315/169.3 |
| 6,307,544 | B1 * | 10/2001 | Harding | 715/709 |
| 6,341,359 | B1 * | 1/2002 | Aiken et al. | 714/100 |
| 6,898,516 | B2 * | 5/2005 | Pechatnikov et al. | 701/202 |
| 7,028,193 | B1 * | 4/2006 | Slater et al. | 713/185 |
| 7,120,613 | B2 * | 10/2006 | Murata | 706/12 |
| 7,149,968 | B1 * | 12/2006 | Ackerschewski et al. | 715/255 |
| 2002/0026516 | A1 * | 2/2002 | Yoo | 709/227 |
| 2002/0116414 | A1 * | 8/2002 | Tesch et al. | 707/515 |

(Continued)

FOREIGN PATENT DOCUMENTS

EP 752675 A1 * 1/1997

(Continued)

OTHER PUBLICATIONS

Microsoft Office Word 2003, Part of Microsoft Office professional Edition 2003.*

(Continued)

*Primary Examiner*—Javid A Amini

(57) ABSTRACT

The invention relates to a method and a system for entering data (12-15) in a data processing system (1). In this case, the data (12-15) is entered in a number of steps (2-5), with a view being displayed at a step (2-5) in a display region (19) of a display means (6), with the entering and/or display taking place in subsequent steps (2-5) at least partially as a function of the data (12-15) entered in one or a number of preceding steps (2-5). To design the step-by-step entering of data in a more user friendly manner, it is proposed to simultaneously display the views (16-18) of a number of consecutive steps (2-5)in the display region (19).

13 Claims, 2 Drawing Sheets

U.S. PATENT DOCUMENTS

| | | |
|---|---|---|
| 2003/0040900 A1* | 2/2003 | D'Agostini .................... 704/2 |
| 2003/0179230 A1* | 9/2003 | Seidman ..................... 345/750 |
| 2004/0147261 A1* | 7/2004 | Roelands ................. 455/432.3 |
| 2005/0059441 A1* | 3/2005 | Miyashita ................ 455/575.1 |
| 2005/0099400 A1* | 5/2005 | Lee ............................ 345/173 |
| 2005/0125268 A1* | 6/2005 | Danninger et al. ............. 705/6 |
| 2005/0131777 A1* | 6/2005 | Davidson et al. ............. 705/27 |
| 2005/0223336 A1* | 10/2005 | Plow et al. ................. 715/804 |

FOREIGN PATENT DOCUMENTS

| | | |
|---|---|---|
| EP | 0927945 A2 | 7/1999 |
| EP | 1437648 A2 | 7/2004 |
| WO | WO 2004111843 A1 * | 12/2004 |

OTHER PUBLICATIONS

Anonymous, "Travelocity" Online, Feb. 25, 2004, Internet Article, retrieved from the Internet: URL:http://web.archive.org/web/200402130418044www.travelocity.com/?Service=TRALVOCITY>, Retrieved on May 24, 2005, pp. 1-6, XP00232955.

Anonymous, "myYahoo" Online, Oct. 29, 2003, Internet Article, retrieved from the Internet: URL:http://web.archive.org/web/20031029090404/www.yahoo.com/r/il>, Retrieved on May 24, 2005, pp. 1-2, XP002329282.

* cited by examiner

ENTRY OF DATA IN A DATA PROCESSING SYSTEM

CROSS REFERENCE TO RELATED APPLICATIONS

This application claims priority of the European application No. 04030186.3 EP filed on Dec. 20, 2004, which is incorporated by reference herein in its entirety.

FIELD OF INVENTION

The invention relates to a method and a system for entering data in a data processing system and a computer program product (e.g., a computer readable medium containing computer readable code) for implementing the method. In this case, data is entered in a number of steps, with one view being displayed in each instance at a step in a display region of a display means, and with the entry and/or display taking place in subsequent steps at least partially as a function of the data entered in one or a number of preceding steps.

BACKGROUND OF INVENTION

Such a method or system for entering data is usually also referred to as a wizard. In this case a wizard guides the user through a complex problem by running individual steps. In this case, a wizard only displays the current processing step. With a wizard, a user can usually return to already processed steps, but then in some circumstances must once again enter the following steps. EP 1 437 648 A2 describes a system for developing and implementing wizards.

SUMMARY OF INVENTION

An object underlying the invention is to design the step-by-step entry of data in a data processing system in a more user friendly manner.

This object is achieved by means of a method for entering data in a data processing system according to the claims. In this case, the data is entered in a number of steps, with one view being displayed in each instance at each step in a display region of a display means, with the entry and/or display taking place in subsequent steps at least partially as a function of the data entered in one or a number of preceding steps, with the views of a number of consecutive steps being simultaneously displayed in the display region.

This object is achieved by means of a system for entering data in a data processing system according the claims. In this case, the data can be entered in a number of steps, with a display means being provided with a display region for displaying a view, in each instance, at a step, with data and/or views of subsequent steps being at least partially detectable and/or displayable as a function of the data entered in one or a number of preceding steps, with the views of a number of consecutive steps being simultaneously displayable in the display region.

This object is further achieved by a computer program product for implementing the above-mentioned method.

With previously known methods for the entry of data in a data processing system, in particular with wizard-based methods, a user is not able to see decisions he made in a preceding step, without exiting from at least the currently processed step. Unlike previous methods, the invention also allows the convenient overview of all data and/or decisions entered in the preceding steps. The user is thus able to see the preceding steps without discontinuing the processing of the current step. He can possibly even change settings in preceding steps. Furthermore, the user can quickly get a general idea about all steps and the data and/or decisions entered in these steps, since the views of a number of consecutive steps are simultaneously displayed according to the invention in a display region, and are thus simultaneously visible to the user.

According to an advantageous embodiment of the invention, the data entered in a step is processed according to the relevant step in the data processing system. The resulting step-by-step processing of the data thus enables the views of subsequent steps to be adapted to the data entered, in each instance, into the preceding steps.

To design the processing of data in a more flexible manner, it is proposed according to a further advantageous embodiment of the invention to change an arrangement of the views within the display region, with a part of the views being at least temporarily masked out.

A display of the views corresponding to the sequence of the steps is advantageously displayed such that said views in the display region are arranged side by side, in particular vertically or horizontally side by side.

In order to unambiguously delimit the steps from one another, it is proposed according to a further advantageous embodiment of the invention to start and/or end a step by navigation means.

According to a further particularly advantageous embodiment of the invention, preceding steps can be processed. In this case which does not influence subsequent steps can in particular be processed in preceding steps can, e.g. the address entered in a preceding step can subsequently be changed. If data is changed and/or processed in a preceding step, which influence subsequent steps, the system advantageously reacts such that the optionally required processing of the subsequent steps is requested from and/or made possible for the user again if necessary.

The invention is described in more detail below with reference to the exemplary embodiments displayed in the figures, in which;

DETAILED DESCRIPTION OF INVENTION

Figure 1:
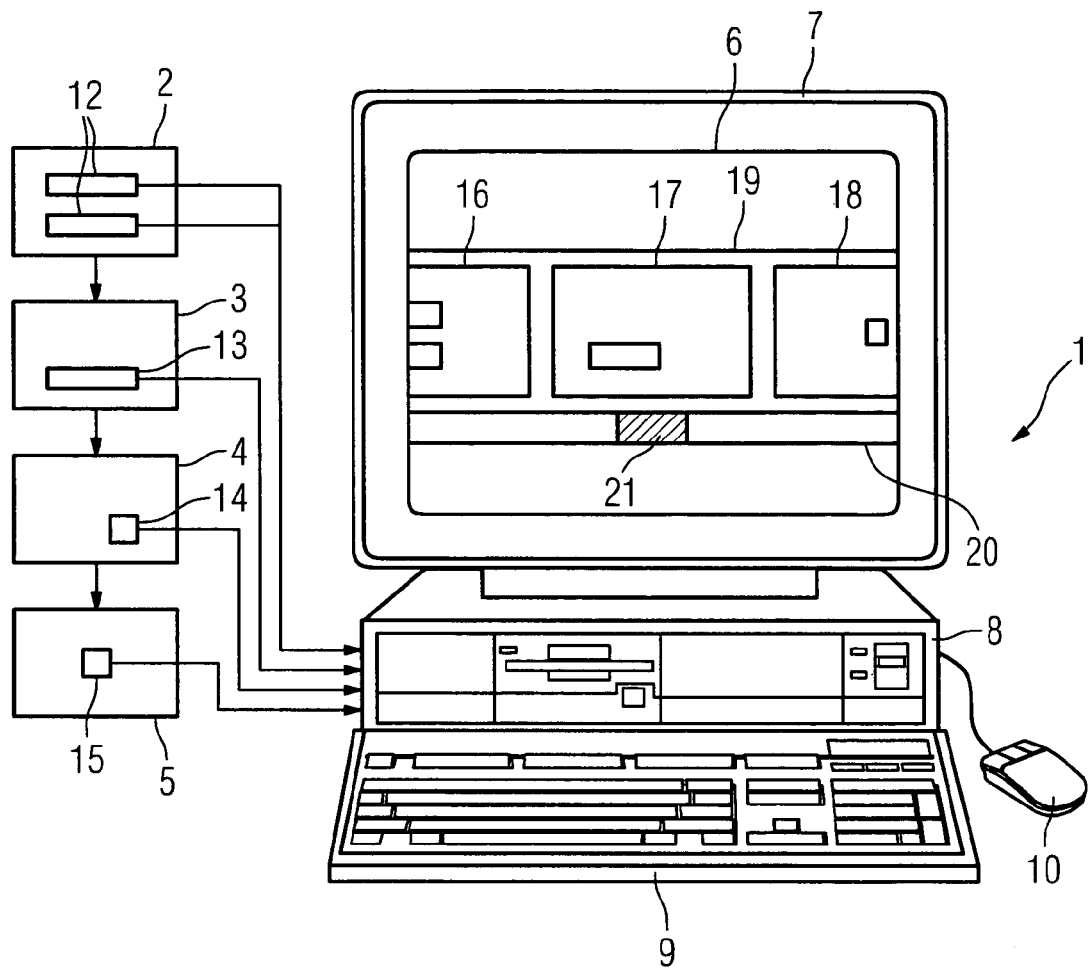
FIG. 1 shows a system for entering data in a data processing system.

FIG. 1 shows an exemplary embodiment of a system for entering data 12-15 in a data processing system 1. The data 12-15 can be entered in a number of steps 2-5, as is indicated schematically in FIG. 1. The steps 2-5 are consecutive. The data processing system 1 has a computer 8, input means 9, 10 and a display means 6, in this case a screen of a monitor 7. The data 12-15 can be input step by step into the data processing system 1 and/or the computer 8 by a user. The user of the system is, in this case, supported respectively by the display of a view 16, 17, 18 at a step 2, 3, 4. According to the exemplary embodiment of the invention shown, the views 16,17,18 of a number of consecutive steps 2, 3, 4, are at least partially simultaneously displayed in the display region 19. The selection of the respectively displayed views and/or steps is supported by the display of a scrollbar 20 with a bar 21 for specifying the current position within the displayed processing steps.

Figure 2:
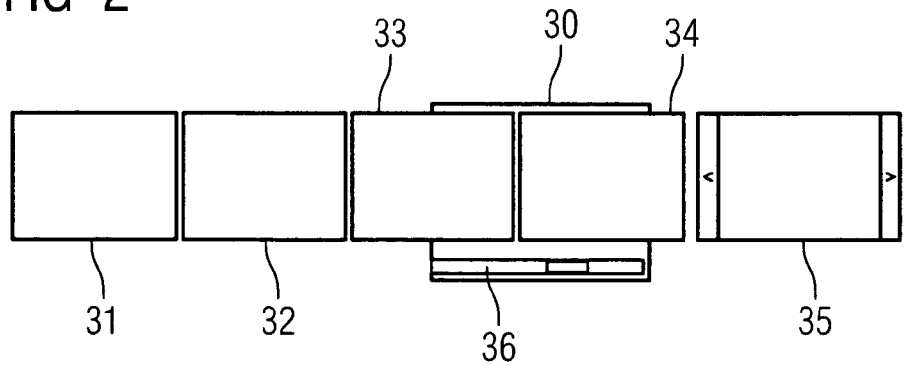
FIG. 2 shows a schematic display of an exemplary embodiment of the invention.

FIG. 2 again symbolically displays a number of processing steps 31-35 of an input process. In this case, only the steps 33 and 34 are partially visible in the display region 30 for the displayed status of the system. The arrangement of the views within the display region 30 can be changed by the corresponding use of the scrollbar 36. In contrast to a conventional wizard, which, as it were, stacks all processing pages one on top of the another, and with which only the uppermost page is to be seen, according to the exemplary embodiment of the invention, the processing pages are vertically or horizontally arranged side by side. The display region, e.g. a window, now has a scrollbar (horizontal/vertical) with which all previous/current steps can be scrolled over in order to view these steps.

Figure 3:
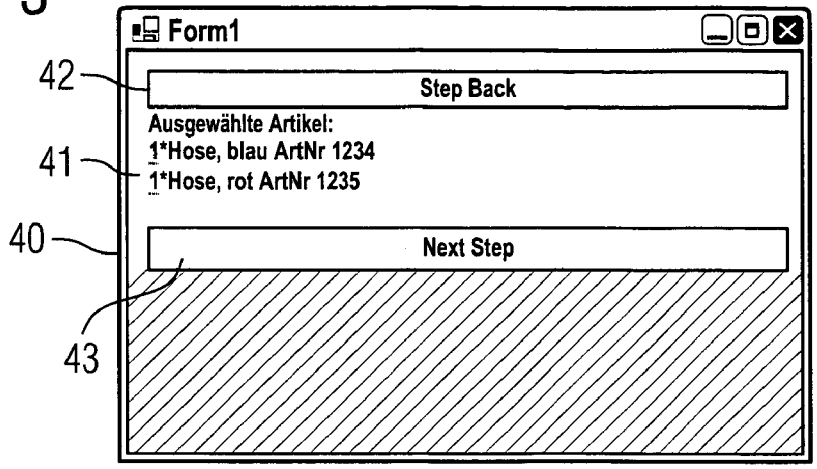
FIG. 3-5 shows the display of views from a number of consecutive steps in each instance in a display region.
Figure 4:
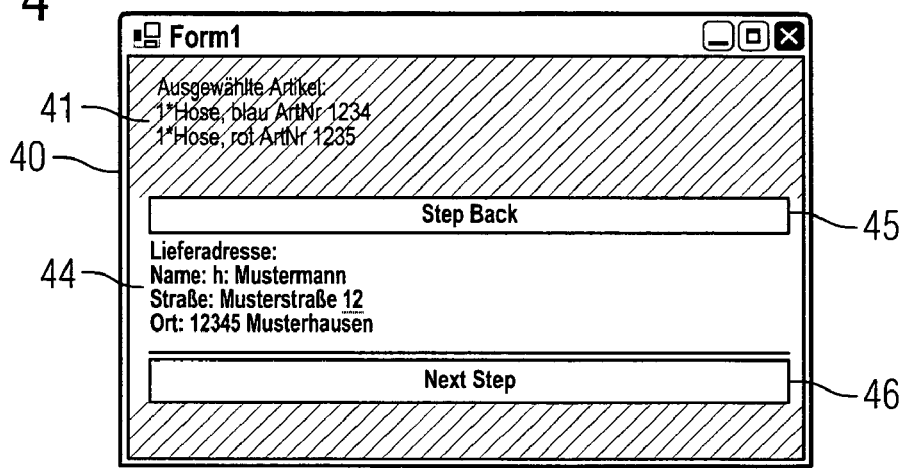
Figure 5:
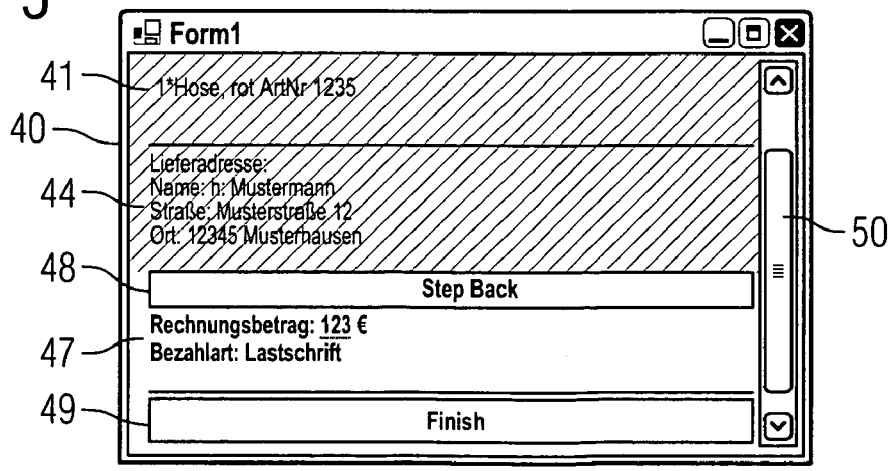

FIG. 3 to FIG. 5 each show the display region 40 to display the views 41, 44, 47 of a number of consecutive steps within a method for entering data. According to the display of FIG. 3, a first view 41 of a first processing step is displayed in the display region 40. A user of the system can execute specific inputs assigned to this processing step, which are entered by the system. With navigation means 42, 43 the user can start the respective step, terminate or return to a step. According to an exemplary embodiment the current step is ended by activating the navigation means 43, i.e. the data input during the processing of the relevant step is stored and/or processed and the next step 44 is activated. The last page, i.e., the view of the last step, is thus framed by navigation push buttons, with which the user can process the last step and/or call up the next step.

According to FIG. 4, the next step 44, which is now the current step, is displayed in the active display region. The preceding step 41 nevertheless remains visible in the display region 40. Navigation means 45, 46 are also displayed at the now current working step 44, with which a step can be returned to and/or the currently processed step can be ended.

Accordingly, during activation of the next step 47, this step is displayed in the active display region, whereupon the preceding steps 41 and 44 are furthermore at least partially visible but at least currently not processable. A part of the view on the first step 41 is masked out according to FIG. 5, since the display region 40 can only display a restricted number of lines. To enable all information to be displayed, a scrollbar 50 is displayed, by means of which the respective view can be selected by moving the displayed content.

Normally only the last page can be processed and all preceding pages can only be read. However, depending on the environment it would also be possible to continue to allow the preceding pages to be editable. This produces the following advantages; the user can view the preceding steps him/herself, without terminating the processing of the current steps. The user can possibly even change settings in preceding steps, and the user can quickly get a general idea about all steps, since a number of steps can also be simultaneously visible in certain circumstances.

In summary, the invention thus relates to a method and a system for entering data 12-15 in a data processing system 1. In this case, the data 12-15 is entered in a number of steps 2-5, with a view 16-18 being displayed at a step 2-5 in a display region 19 of a display means 6, with the entry and/or display taking place, in subsequent steps 2-5, at least partially as a function of the data 12-15 entered in one or a number of preceding steps. To design the step-by-step entry of data in a more user friendly manner, a proposal is made to simultaneously display the views 16-18 of a number of consecutive steps 2-5 in the display region 19.

The invention claimed is:

1. A method for entering data in a data processing system having a display unit, comprising:

providing a plurality of consecutive steps arranged to form a wizard guide via a display unit electrically coupled to a computer of the data processing system, each step being worked on expecting user input to perform a task defined by the wizard guide, each step being worked on having at least one of a first navigating step bar including text instructions for navigating to a preceding step, and a second navigating step bar including text instructions for navigating to a subsequent step, wherein the data entered in one of the plurality of steps is processed in the data processing system after the respective step;

providing a plurality of views each containing respective alphanumeric characters, each view associated to one of the plurality of steps of the wizard guide;

displaying at least some of the respective alphanumeric characters of each of the plurality of views in a display region on the display unit, wherein the views within the display region are changeable via a scrollbar, and wherein the scrollbar allows a scrolling over the steps;

editing input data for at least one preceding step of the wizard guide without causing a processing termination of a present step of the wizard guide being worked on, and further wherein the displaying comprises concurrently displaying respective fields associated with the present step and with the at least one preceding step being edited, wherein at least some of the input data entered in said at least one preceding step of the wizard guide influences a processing of at least one subsequent step of the wizard guide being concurrently displayed; and requesting the user to rework said at least subsequent step of the wizard guide so that a reprocessing of said at least one subsequent step of the wizard guide is performed by the data processing system in view of the input data entered in said at least one preceding step of the wizard guide.

2. The method according to claim 1, wherein an arrangement of the views within the display region is changed with a part of the views being at least partially masked out.

3. The method according to claim 1, wherein the views are arranged vertically side by side or wherein the views are arranged horizontally side by side.

4. The method according to claim 1, wherein the step is started after navigating to the associated view.

5. The method according to claim 1, wherein the step is stopped after navigating from the associated view.

6. The method according to claim 5, wherein a preceding step can be reprocessed.

7. The method according to claim 6, wherein after processing a preceding step, only reprocessing the steps between the preceding step and a current step that are affected by the data entered in the preceding step.

8. A system for entering data in a data processing system, comprising:

a display unit having a display region;

a plurality of consecutive steps arranged to form a wizard guide via the display unit, wherein each step being worked on is configured to expect data to perform a task defined by the wizard guide, and wherein each step being worked on is further configured with at least one of a first navigating step bar including text instructions for navigating to a preceding step of the wizard guide, and a second navigating step bar including text instructions for navigating to a subsequent step of the wizard guide, wherein the data processing system processes the data entered in the step after the respective step; and a plurality of views each containing respective alphanumeric characters, each view associated with at least one of the plurality of steps of the wizard guide, at least some of the respective alphanumeric characters of each of the plurality of views displayed concurrently in the display region, wherein the views within the display region are changeable via a scrollbar, and wherein the scrollbar allows a scrolling over the steps, wherein input data for at least one preceding step of the wizard guide can be edited without causing a processing termination of a present step of the wizard guide being worked on, and further wherein respective views associated with the present step and with the at least one preceding step are concurrently displayed, wherein at least some of the input data entered in said at least preceding step of the wizard guide influences a processing of at least one subsequent step of the wizard guide being concurrently displayed; and wherein the system is configured to request the user to rework said at least one subsequent step of the wizard guide so that a reprocessing of said at least one subsequent step of the wizard guide is performed by the data processing system in view of the input data entered in said at least preceding step of the wizard guide.

9. The system according to claim 8, wherein the arrangement of the views within the display region changes by masking out a subset of the views.

10. The system according to claim 8, wherein the views in the display region are arranged vertically or horizontally.

11. The system according to claim 8, wherein by navigating to a view the associated step is started.

12. The system according to claim 8, wherein by navigating from a view the associated step is stopped.

13. The system according to claim 8, wherein a preceding step can be processed.

* * * * *